(12) United States Patent
Dimou et al.

(10) Patent No.: US 12,407,395 B2
(45) Date of Patent: Sep. 2, 2025

(54) BEAM SWITCHING BASED AT LEAST IN PART ON A NEGATIVE ACKNOWLEDGEMENT TRANSMISSION

(71) Applicant: QUALCOMM Incorporated, San Diego, CA (US)

(72) Inventors: Konstantinos Dimou, New York City, NY (US); Yan Zhou, San Diego, CA (US); Junyi Li, Fairless Hills, PA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/760,066

(22) PCT Filed: Feb. 26, 2021

(86) PCT No.: PCT/US2021/019988
§ 371 (c)(1),
(2) Date: Aug. 3, 2022

(87) PCT Pub. No.: WO2021/174057
PCT Pub. Date: Sep. 2, 2021

(65) Prior Publication Data
US 2023/0064026 A1    Mar. 2, 2023

(30) Foreign Application Priority Data
Feb. 28, 2020   (GR) ............................. 20200100110

(51) Int. Cl.
*H04B 7/06*    (2006.01)
*H04L 1/1829*  (2023.01)
*H04L 5/00*    (2006.01)

(52) U.S. Cl.
CPC ......... *H04B 7/0695* (2013.01); *H04L 1/1861* (2013.01); *H04L 5/0055* (2013.01); *H04L 5/0057* (2013.01)

(58) Field of Classification Search
CPC .... H04B 7/0695; H04B 7/0408; H04B 7/088; H04L 1/1861; H04L 5/0055;
(Continued)

(56) References Cited

U.S. PATENT DOCUMENTS

2018/0091262 A1   3/2018  Jung et al.
2019/0021085 A1*  1/2019  Mochizuki ............ H04W 76/27
(Continued)

FOREIGN PATENT DOCUMENTS

| CN | 108632837 A | 10/2018 |
|----|-------------|---------|
| CN | 108702180 A | 10/2018 |
| EP | 3573269 A1  | 11/2019 |

OTHER PUBLICATIONS

International Search Report and Written Opinion—PCT/US2021/019988—ISA/EPO—Jun. 14, 2021.

*Primary Examiner* — Obaidul Huq
(74) *Attorney, Agent, or Firm* — Harrity & Harrity, LLP

(57) ABSTRACT

Various aspects of the present disclosure generally relate to wireless communication. In some aspects, a user equipment (UE) may transmit a measurement report indicating a set of channel quality indicators for a set of candidate beams; determine that a downlink transmission from a base station is not received via one or more beams of the set of candidate beams; and transmit a negative acknowledgement for the downlink transmission via one or more new beams of the set of candidate beams. Numerous other aspects are provided.

30 Claims, 9 Drawing Sheets

(58) Field of Classification Search
CPC ............... H04L 5/0057; H04L 5/0023; H04L 2001/125; H04L 1/06
USPC ..................................... 370/310, 328, 329
See application file for complete search history.

(56) References Cited

U.S. PATENT DOCUMENTS

2019/0052338 A1* 2/2019 Nader ................. H04B 7/0695
2021/0258057 A1* 8/2021 Kim ..................... H04L 5/0057

* cited by examiner

BEAM SWITCHING BASED AT LEAST IN PART ON A NEGATIVE ACKNOWLEDGEMENT TRANSMISSION

CROSS-REFERENCE TO RELATED APPLICATIONS

This Patent Application is a 371 national stage of PCT Application No. PCT/US2021/019988 filed on Feb. 26, 2021, entitled "BEAM SWITCHING BASED AT LEAST IN PART ON A NEGATIVE ACKNOWLEDGEMENT TRANSMISSION," which claims priority to Greek Patent Application No. 20200100110, filed on Feb. 28, 2020, entitled "BEAM SWITCHING BASED AT LEAST IN PART ON A NEGATIVE ACKNOWLEDGEMENT TRANSMISSION." The disclosure of the prior Applications are considered part of and are hereby expressly incorporated by reference in this Patent Application.

FIELD OF THE DISCLOSURE

Aspects of the present disclosure generally relate to wireless communication and to techniques and apparatuses for beam switching based at least in part on a negative acknowledgement (NACK) transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting a measurement report indicating a set of channel quality indicators (CQIs) for a set of candidate beams, determining that a downlink transmission from a base station is not received via one or more beams of the set of candidate beams, and transmitting a negative acknowledgement (NACK) for the downlink transmission via one or more new beams of the set of candidate beams.

In some aspects, a method of wireless communication, performed by a base station, may include receiving, from a UE, a measurement report indicating a set of CQIs for a set of candidate beams, transmitting a downlink transmission to the UE via one or more beams of the set of candidate beams, and receiving, from the UE, a NACK for the downlink transmission via one or more new beams of the set of candidate beams.

In some aspects, a UE for wireless communication may include a memory and one or more processors operatively coupled to the memory. The memory and the one or more processors may be configured to transmit a measurement report indicating a set of CQIs for a set of candidate beams, determine that a downlink transmission from a base station is not received via one or more beams of the set of candidate beams, and transmit a NACK for the downlink transmission via one or more new beams of the set of candidate beams.

In some aspects, a base station for wireless communication may include a memory and one or more processors operatively coupled to the memory. The memory and the one or more processors may be configured to receive, from a UE, a measurement report indicating a set of CQIs for a set of candidate beams, transmit a downlink transmission to the UE via one or more beams of the set of candidate beams, and receive, from the UE, a NACK for the downlink transmission via one or more new beams of the set of candidate beams.

In some aspects, a non-transitory computer-readable medium may store one or more instructions for wireless communication. The one or more instructions, when executed by one or more processors of a UE, may cause the one or more processors to transmit a measurement report indicating a set of CQIs for a set of candidate beams, determine that a downlink transmission from a base station is not received via one or more beams of the set of candidate beams, and transmit a NACK for the downlink transmission via one or more new beams of the set of candidate beams.

In some aspects, a non-transitory computer-readable medium may store one or more instructions for wireless communication. The one or more instructions, when executed by one or more processors of a base station, may cause the one or more processors to receive, from a UE, a measurement report indicating a set of CQIs for a set of candidate beams, transmit a downlink transmission to the UE via one or more beams of the set of candidate beams, and receive, from the UE, a NACK for the downlink transmission via one or more new beams of the set of candidate beams.

In some aspects, an apparatus for wireless communication may include means for transmitting a measurement report indicating a set of CQIs for a set of candidate beams, means for determining that a downlink transmission from a base station is not received via one or more beams of the set of candidate beams, and means for transmitting a NACK for the downlink transmission via one or more new beams of the set of candidate beams.

In some aspects, an apparatus for wireless communication may include means for receiving, from a UE, a measurement report indicating a set of CQIs for a set of candidate beams, means for transmitting a downlink transmission to the UE via one or more beams of the set of candidate beams, and means for receiving, from the UE, a NACK for the downlink transmission via one or more new beams of the set of candidate beams.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
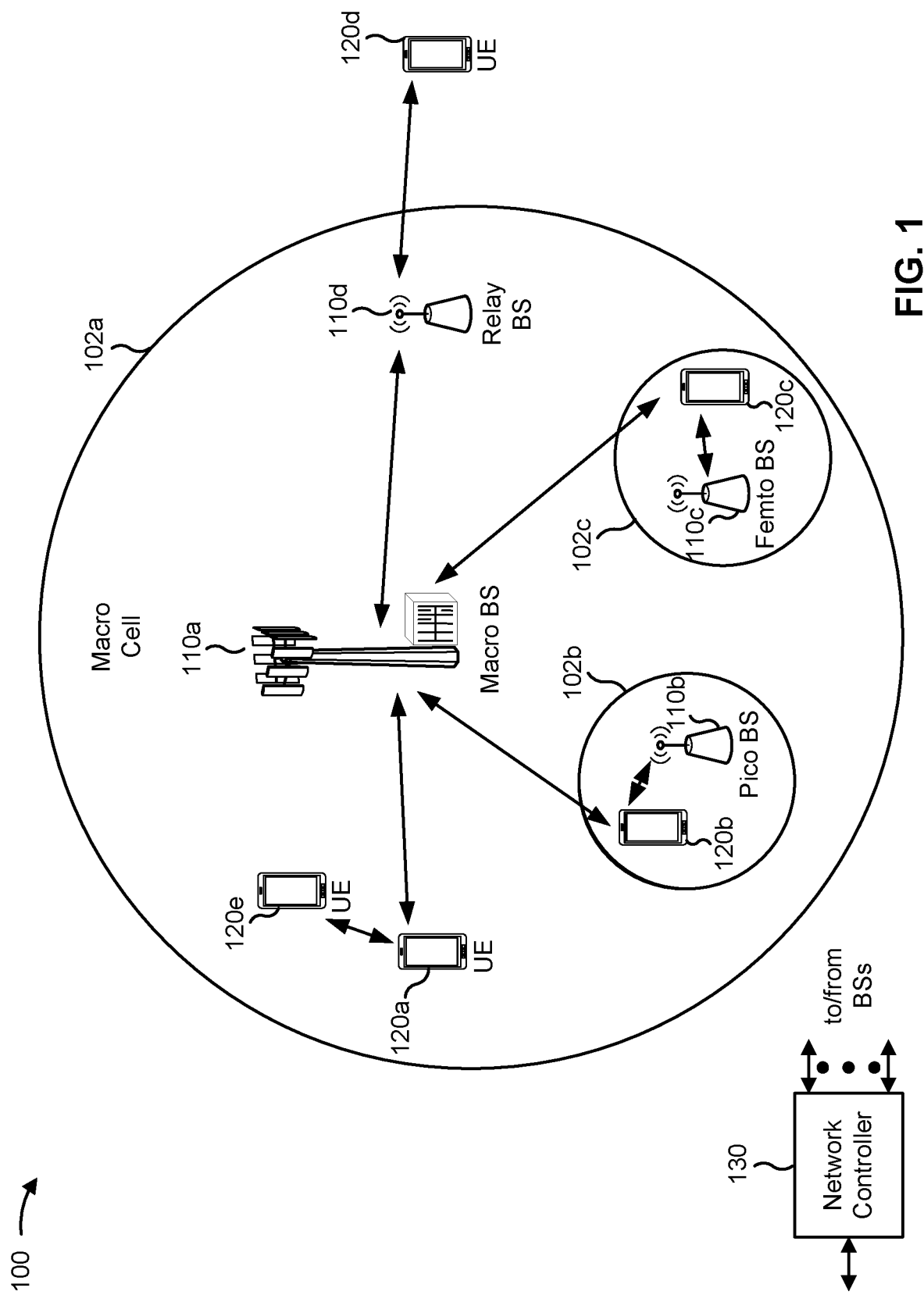
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
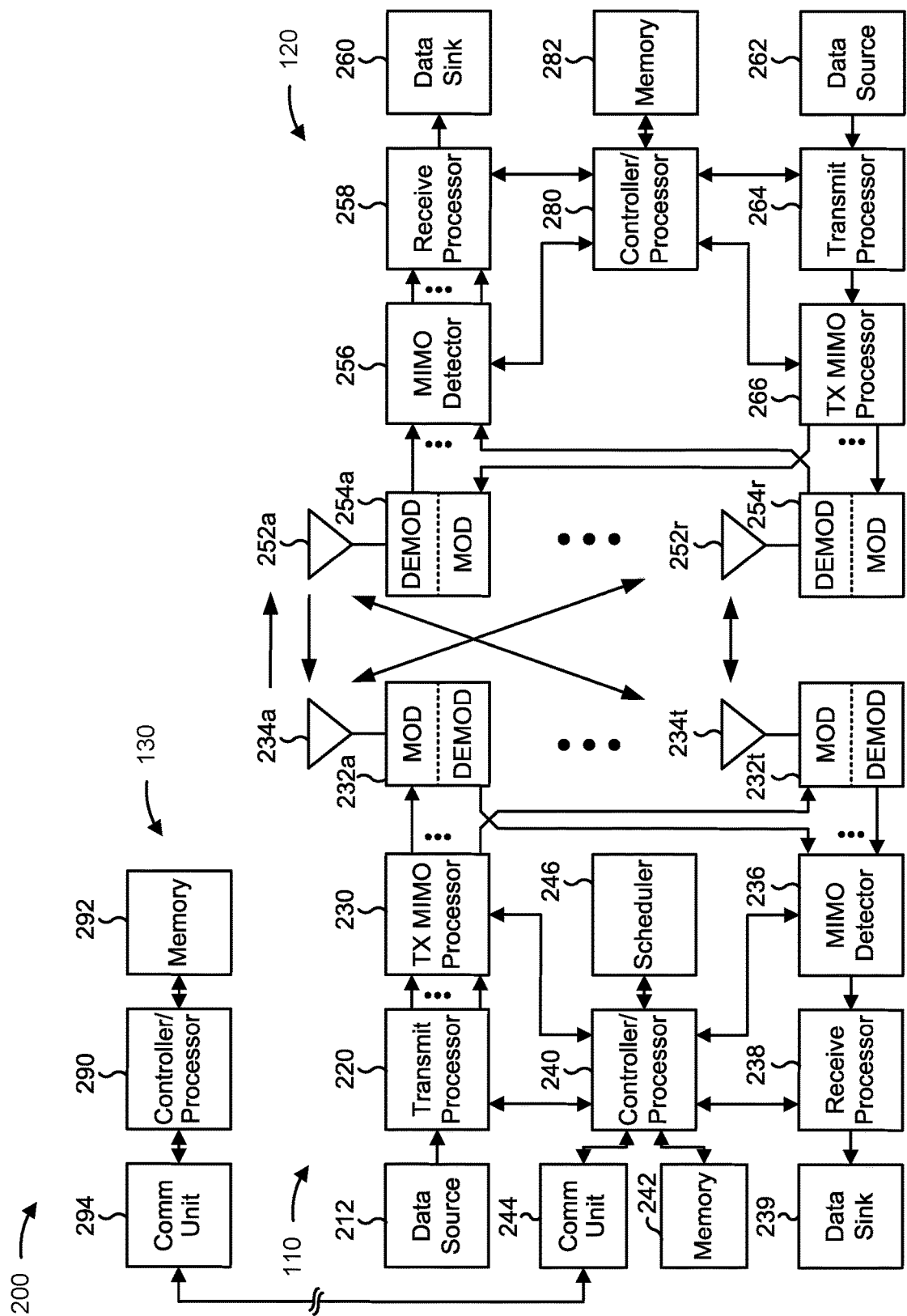
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-9.

Controller/processor 240 of base station 110, controller/processor 280 of UE 120, and/or any other component(s) of FIG. 2 may perform one or more techniques associated with beam switching based at least in part on a NACK transmission, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for transmitting a measurement report indicating a set of channel quality indicators for a set of candidate beams; means for determining that a downlink transmission from a base station is not received via one or more beams of the set of candidate beams; or means for transmitting a negative acknowledgement for the downlink transmission via one or more new beams of the set of candidate beams. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for performing beam sweeping using the one or more new beams.

In some aspects, the UE includes means for performing the beam sweeping using the one or more new beams and the one or more beams.

In some aspects, the UE includes means for sequentially transmitting the negative acknowledgement for the downlink transmission via the one or more new beams and the one or more beams in an order that is based at least in part on the set of channel quality indicators.

In some aspects, the UE includes means for transmitting the negative acknowledgement for the downlink transmission via the one or more beams of the set of candidate beams; or means for receiving an indication of an interpretation, by the base station, of a hybrid automatic repeat request (HARQ) feedback occasion associated with the negative acknowledgement as an acknowledgement, wherein transmitting the negative acknowledgement for the downlink transmission via the one or more new beams is based at least in part on a mismatch between the interpretation by the base station and the negative acknowledgement.

In some aspects, the UE includes means for receiving radio resource control (RRC) reconfiguration, RRC connection setup, RRC reestablishment, RRC setup, or RRC resume signaling including an indication to monitor the set of candidate beams for one or more reference signals; means for configuring the UE to monitor the set of candidate beams for the one or more reference signals; or means for transmitting an indication that the UE is configured to monitor the set of candidate beams for the one or more reference signals In some aspects, the UE includes means for obtaining measurements of the one or more reference signals received over the set of candidate beams; or means for determining a ranking, based at least in part on the measurements of the one or more reference signals, of candidate beams of the set of candidate beams.

In some aspects, the UE includes means for selecting, for receiving the downlink transmission, the one or more beams based at least in part on the set of channel quality indicators.

In some aspects, the UE includes means for selecting a number of the one or more beams based at least in part on a configuration of the UE.

In some aspects, the UE includes means for selecting, for transmitting the negative acknowledgement for the downlink transmission, the one or more new beams based at least in part on the set of channel quality indicators.

In some aspects, the UE includes means for selecting a number of the one or more new beams based at least in part on a configuration of the UE.

In some aspects, the UE includes means for determining that a timing offset, between transmitting the measurement report and an occasion for transmitting the negative acknowledgement via the one or more new beams of the set of candidate beams, satisfies a timing threshold, wherein transmitting the negative acknowledgement via the one or more new beams of the set of candidate beams is based at least in part on determining that the timing offset satisfies the timing threshold.

In some aspects, the UE includes means for receiving a downlink control information message indicating that at least one of the one or more new beams is to be used for at least one additional downlink transmission.

In some aspects, the UE includes means for transmitting the negative acknowledgement for the downlink transmission via the one or more new beams without receiving, from a base station, an indication to transmit the negative acknowledgement for the downlink transmission via the one or more new beams after determining that the downlink transmission from the base station is not received via the one or more beams.

In some aspects, the base station includes means for receiving, from a UE, a measurement report indicating a set of channel quality indicators for a set of candidate beams; means for transmitting a downlink transmission to the UE via one or more beams of the set of candidate beams; or means for receiving, from the UE, a negative acknowledgement for the downlink transmission via one or more new beams of the set of candidate beams. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for monitoring the one or more new beams of the set of candidate beams for the negative acknowledgement for the downlink transmission.

In some aspects, the base station includes means for monitoring the one or more new beams of the set of candidate beams and the one or more beams for the negative acknowledgement for the downlink transmission.

In some aspects, the base station includes means for sequentially monitoring for the negative acknowledgement for the downlink transmission via the one or more new beams and the one or more beams in an order that is based at least in part on the set of channel quality indicators.

In some aspects, the base station includes means for selecting at least one of the one or more new beams of the set of candidate beams for at least one additional downlink transmission.

In some aspects, the base station includes means for selecting the at least one of the one or more new beams of the set of candidate beams for the at least one additional downlink transmission based at least in part on the set of channel quality indicators.

In some aspects, the base station includes means for transmitting a downlink control information message indicating that at least one of the one or more new beams is to be used for the at least one additional downlink transmission.

In some aspects, the base station includes means for determining that a timing offset, between receiving the measurement report and an occasion for receiving the negative acknowledgement via the one or more new beams of the set of candidate beams, satisfies a timing threshold, wherein transmitting the downlink control information message indicating that the at least one of the one or more new beams is to be used for the at least one additional downlink transmission is based at least in part on determining that the timing offset satisfies the timing threshold.

In some aspects, the base station includes means for selecting a number of the one or more new beams based at least in part on an indication provided to the UE.

In some aspects, the base station includes means for transmitting RRC reconfiguration signaling including an indication to monitor the set of candidate beams for one or more reference signals; or means for receiving an indication that the UE is configured to monitor the set of candidate beams for the one or more reference signals.

In some aspects, the base station includes means for selecting, for transmitting the downlink transmission, the one or more beams based at least in part on the set of channel quality indicators.

In some aspects, the base station includes means for selecting a number of the one or more beams based at least in part on an indication provided to the UE.

In some aspects, the base station includes means for receiving the negative acknowledgement for the downlink transmission via the one or more new beams without transmitting an indication to transmit the negative acknowledgement for the downlink transmission via the one or more new beams after transmitting the downlink transmission to the UE via the one or more beams of the set of candidate beams.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
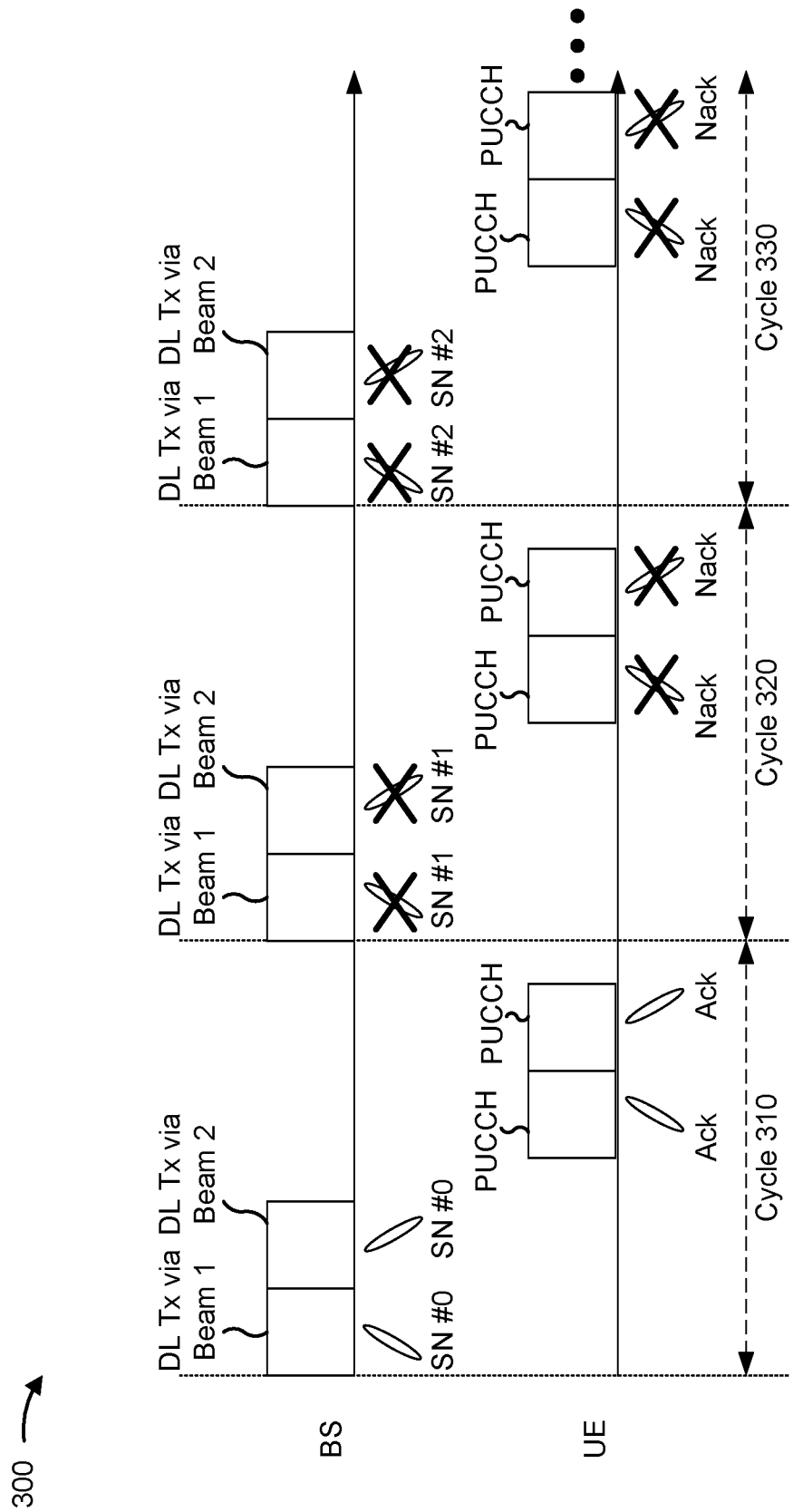
FIG. 3 is a diagram illustrating an example of hybrid automatic repeat request (HARQ) feedback, in accordance with the present disclosure.

FIG. 3 is a diagram illustrating an example 300 of HARQ feedback, in accordance with the present disclosure. As shown in FIG. 3, a base station and a UE may communicate downlink transmissions and HARQ feedback using one or more beams.

As shown in FIG. 3, and in cycle 310, the base station may transmit a downlink transmission, having a sequence number 0, via a beam 1 and a beam 2. The base station may transmit the downlink transmission using a physical downlink shared channel (PDSCH). The PDSCH may be scheduled using semi-persistent scheduling.

As further shown in cycle 310, the UE may transmit an acknowledgement (ACK) to indicate that the UE received the downlink transmission having the sequence number 0. The UE may transmit the ACK for sequence number 0 using a physical uplink control channel (PUCCH). The UE may transmit the ACK for sequence number 0 using one or more beams. When the PUCCH and the PDSCH have beam reciprocity, the UE may transmit the ACK for sequence number 0 using the beam 1 and/or the beam 2. The base station may receive the ACK from the UE to indicate that the UE received the downlink transmission having the sequence number 0.

As shown in cycle 320, the base station may transmit a downlink transmission, having a sequence number 1, via the beam 1 and the beam 2. As further shown, the UE may not receive the downlink transmission having the sequence number 1 (e.g., based at least in part on blocking, interference, and/or the like).

The UE may monitor for an occasion associated with the downlink transmission having the sequence number 1 (e.g., based at least in part on scheduling from the base station). Based at least in part on the UE not receiving the downlink transmission having the sequence number 1, the UE may transmit a NACK via the beam 1 and/or the beam 2. As further shown, the base station may not receive the NACK (e.g., based at least in part on blocking, interference, and/or the like).

In some configurations, the base station may be configured to interpret an occasion for HARQ feedback, in which no HARQ feedback is received, as an ACK. In these configurations, the base station may interpret an occasion, associated with receiving the HARQ feedback associated with the NACK of cycle 320, as an ACK instead of the intended NACK. This may be referenced as a NACK to ACK error or a mismatch of HARQ feedback.

As shown in cycle 330, the base station may transmit a downlink transmission, having a sequence number 2, via the beam 1 and the beam 2, based at least in part on failing to receive the NACK of cycle 320 that was intended to indicate that the UE did not receive a previous transmission using the beam 1 and the beam 2. As further shown, the UE may not receive the downlink transmission having the sequence number 2 (e.g., based at least in part on blocking, interference, and/or the like).

The UE may monitor for an occasion associated with the downlink transmission having the sequence number 2 (e.g., based at least in part on scheduling from the base station). Based at least in part on the UE not receiving the downlink transmission having the sequence number 2, the UE may transmit a NACK via beam 1 and/or the beam 2. As further shown, the base station may not receive the NACK (e.g., based at least in part on blocking, interference, and/or the like) Similar to cycle 320, the base station may interpret the failure to receive the NACK as an ACK.

The base station may continue to transmit downlink transmissions using the beam 1 and the beam 2 because the base station is unaware that the UE is not receiving the downlink transmissions. Based at least in part on the UE transmitting the NACK using the beam 1 and/or the beam 2, which may be blocked (e.g., by obstacles along paths associated with the beams), the UE may be unable to indicate to the base station that the downlink transmissions are not received by the UE. This may consume computing, communication, and network resources for unsuccessful attempts of communications between the base station and the UE.

As indicated above, FIG. 3 is provided as an example. Other examples may differ from what is described with respect to FIG. 3.

Figure 4:
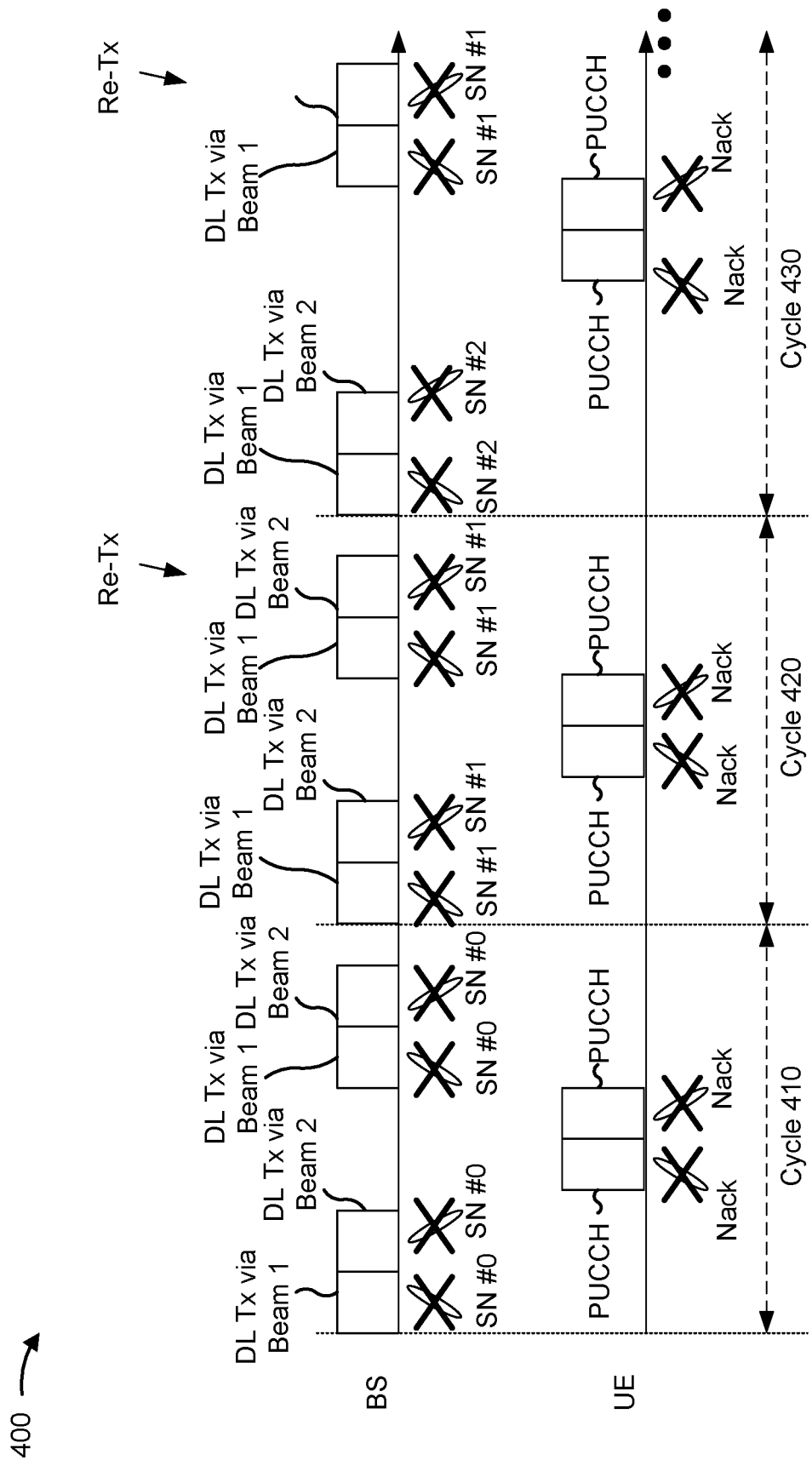
FIG. 4 is a diagram illustrating an example of HARQ feedback, in accordance with the present disclosure.

FIG. 4 is a diagram illustrating an example 400 of HARQ feedback, in accordance with the present disclosure. As shown in FIG. 4, a base station and a UE may communicate downlink transmissions and HARQ feedback using one or more beams.

As shown in FIG. 4, and in cycle 410, the base station may transmit a downlink transmission, having a sequence number 0, via a beam 1 and a beam 2. The base station may transmit the downlink transmission using a PDSCH. The PDSCH may be scheduled using semi-persistent scheduling.

As further shown in cycle 410, the UE may transmit a NACK, via the beam 1 and/or the beam 2, to indicate that the UE did not receive the downlink transmission having the sequence number 0. As shown, the base station may not receive the NACK. The base station may retransmit the downlink transmission having the sequence number 0 using the beam 1 and/or the beam 2. The base station may determine to retransmit the downlink transmission having the sequence number 0 based at least in part on interpreting an occasion, associated with receiving HARQ feedback for the transmission of the downlink transmission having the sequence number 0, as a NACK. The base station may interpret the occasion as a NACK based at least in part on not receiving any HARQ feedback during the occasion and based at least in part on a configuration of the UE to transmit either an ACK or a NACK (e.g., the UE is not configured for discontinuous transmission of HARQ feedback). Additionally, or alternatively, the base station may determine to retransmit the downlink transmission having the sequence number 0 based at least in part on a scheduled retransmission that is independent from the NACK.

As further shown in cycle 410, the UE does not have an occasion to transmit HARQ feedback associated with the retransmission of the downlink transmission associated with the sequence number 0. The UE may not receive the downlink transmission based at least in part on interference, the beam 1 and/or the beam 2 being blocked, and/or the like. Alternatively, the UE may receive (e.g., receive and decode) the downlink transmission based at least in part on compiling the retransmission of beam 1 and/or the retransmission of beam 2. In other words, even though the UE does not properly receive the downlink transmission via any single transmission, the UE may properly receive the downlink transmission using multiple transmissions.

As shown in cycle 420, the base station may transmit a downlink transmission, having a sequence number 1, via the beam 1 and the beam 2. The UE may transmit a NACK, via the beam 1 and/or the beam 2, to indicate that the UE did not receive the downlink transmission having the sequence number 1. As in cycle 410, the base station may not receive the NACK and may retransmit the downlink transmission having the sequence number 1 using the beam 1 and/or the beam 2. As in cycle 410, the UE does not have an occasion during cycle 420 to transmit HARQ feedback associated with the retransmission of the downlink transmission associated with the sequence number 1.

As shown in cycle 430, the base station may transmit a downlink transmission, having a sequence number 2, via the beam 1 and the beam 2. The UE may transmit a NACK, via the beam 1 and/or the beam 2, to indicate that the UE did not receive the downlink transmission having the sequence number 2. As in cycle 410, the base station may not receive the NACK and may retransmit the downlink transmission having the sequence number 2 using the beam 1 and/or the beam 2. As in cycle 410, the UE does not have an occasion during cycle 430 to transmit HARQ feedback associated with the retransmission of the downlink transmission associated with the sequence number 2.

Based at least in part on the UE not having an occasion to transmit the HARQ feedback during the cycles 410, 420, and 430, the base station may be unaware of whether the UE received the downlink transmissions. Instead, the base station may make assumptions of reception or non-reception of the downlink transmissions, and an incorrect assumption may consume computing, communication, and/or network resources to detect and correct.

As indicated above, FIG. 4 is provided as an example. Other examples may differ from what is described with respect to FIG. 4.

As described above, during some communications between a base station and a UE, the UE may be unable to provide HARQ feedback to the base station. For example, as in FIG. 3, the UE may be unable to provide the HARQ feedback based at least in part on blocking of one or more beams used to transmit the HARQ feedback, which may also be used to receive a downlink transmission associated with the HARQ feedback. In some communication systems, the base station may be configured to interpret an occasion, during which no HARQ feedback is received, as an ACK, which may be incorrect if a NACK is transmitted by the UE and not received by the base station. In another example, as in FIG. 4, the UE may not have an occasion to transmit the HARQ feedback based at least in part on a limited time budget of a cycle. Without receiving the HARQ feedback from the UE, the base station may make an assumption of whether the UE received the downlink transmission. If the assumption is incorrect (e.g., a mismatch occurs), the UE and/or the base station may consume computing, communication, and/or network resources to detect and/or correct the incorrect assumption.

In some aspects described herein, a base station (e.g., base station 110) may transmit one or more reference signals via a set of candidate beams. A UE (e.g., UE 120) may monitor for the one or more reference signals via the one or more candidate beams. The UE may obtain measurements of the one or more reference signals and generate a measurement report to identify a ranking of the set of candidate beams based at least in part on the measurements. The UE may transmit the measurement report to the base station to identify a ranking of the set of candidate beams. The UE and the base station may communicate via one or more beams of the set of candidate beams. The one or more beams may be selected based at least in part on the measurement report.

The UE may be configured to, in response to not receiving a downlink transmission from the base station, transmit a NACK for the downlink transmission via one or more new beams of the set of candidate beams. In some aspects, the UE may select the one or more new beams for transmitting the NACK, and the base station may be configured to monitor the one or more new beams of the set of candidate beams for the NACK, based at least in part on the measurements of the one or more reference signals, the measurement report, and/or the ranking of the set of candidate beams. In some aspects, the UE and the base station may continue communicating via the one or more new beams. In this way, the UE and the base station may switch to at least one new beam for communications after a failed attempt to receive a downlink transmission via one or more current beams. In this way, the UE and the base station may conserve computing, communication, and/or network resources that may otherwise have been used to attempt to transmit and receive additional downlink transmissions using a beam through which the UE has failed to receive the downlink transmission.

Figure 5:
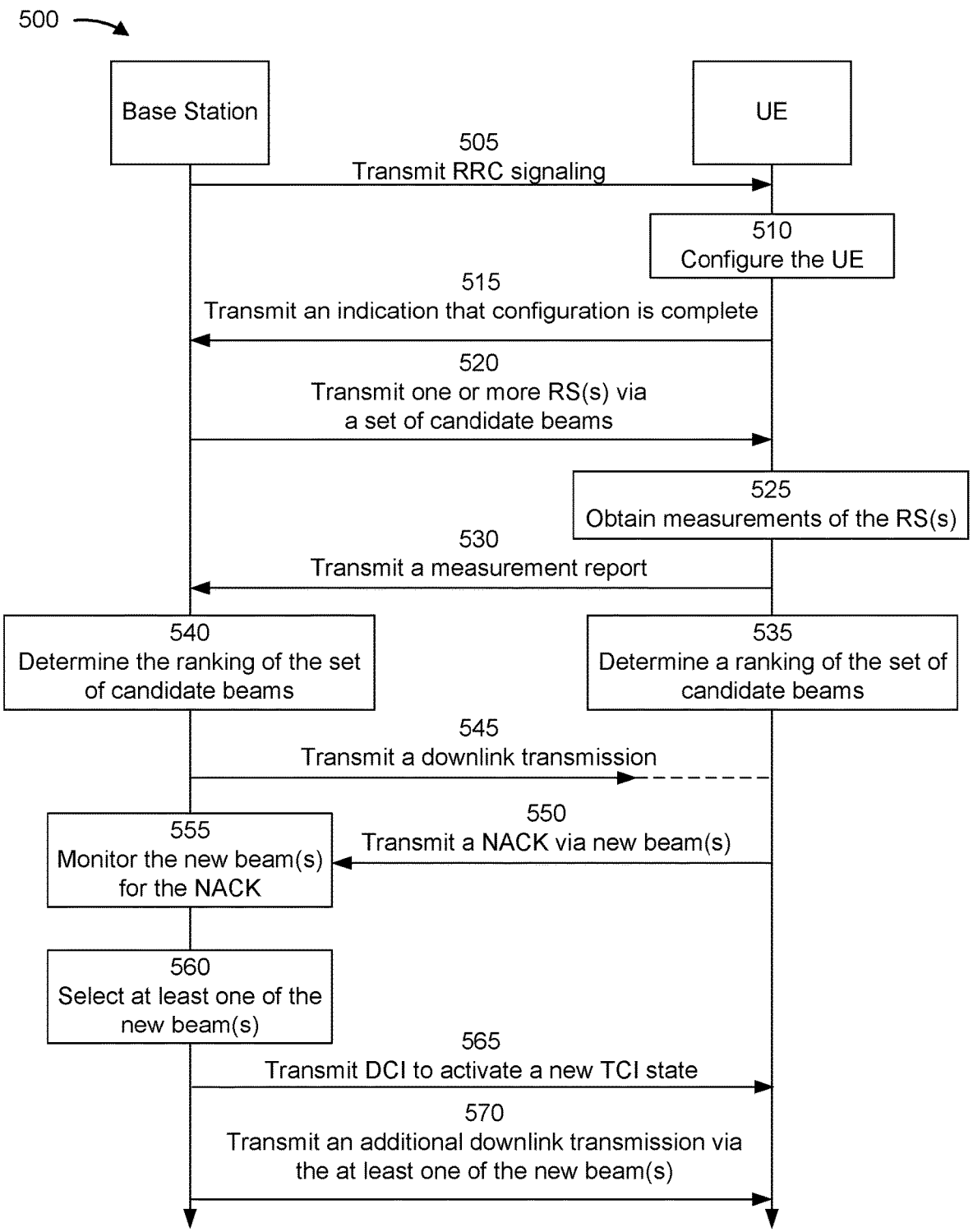
FIG. 5 is a diagram illustrating an example of beam switching based at least in part on a negative acknowledgement (NACK) transmission, in accordance with the present disclosure.

FIG. 5 is a diagram illustrating an example 500 of beam switching based at least in part on a NACK transmission, in accordance with the present disclosure. As shown, a UE (e.g., UE 120) and a base station (e.g., base station 110) may communicate using one or more of RRC signaling, reference signals (RSs), measurement reports, downlink transmissions, HARQ feedback, downlink control information (DCI), and/or the like. In some aspects, the base station and the UE may be part of a wireless network (e.g., the wireless network 100).

As shown in FIG. 5, and by reference number 505, the base station may transmit RRC signaling to the UE. The RRC signaling may include one or more indications of configurations for the UE. In some aspects, the RRC signaling may include one or more indications associated with scheduling downlink transmissions (e.g., semi-persistent scheduling). In some aspects, the RRC signaling may include an RRC reconfiguration message (RRCReconfiguration or RRCR), an RRC connection setup message, an RRC reestablishment message, an RRC setup message, or an RRC resume message with one or more information elements to configure a cell group (e.g., CellGroupConfig). The information element to configure the cell group may include a serving cell configuration (e.g., ServingCellConfiguration) with an information element to configure channel state information (CSI) measurements (e.g., CSI-MeasConfig). In some aspects, the RRC signaling may include an RRC setup (e.g., RRCSetup) message and/or an RRC resume (e.g., RRCResume) message to configure the UE to monitor CSI reference signals (CSI-RSs).

In some aspects, the RRC signaling may indicate that the UE is to monitor a set of candidate beams for one or more reference signals when performing reference signal (e.g., CSI-RS) measurements. In some aspects, the RRC signaling may indicate that the UE is to transmit a NACK, for a downlink transmission scheduled for one or more current beams, via one or more new beams of the set of candidate beams. In some aspects, the RRC signaling may indicate that the UE is to transmit a NACK, for a downlink transmission scheduled for one or more current beams, via one or more new beams of the set of candidate beams if a threshold number of downlink transmissions were not received via one or more current beams (e.g., a threshold number of consecutive downlink transmissions, a threshold portion of downlink transmission, a threshold number of downlink transmissions received over a period of time, and/or the like). In some aspects, the RRC signaling may indicate that the UE is to transmit a NACK, for a downlink transmission scheduled for one or more current beams, via one or more new beams of the set of candidate beams if an indication of an interpretation, by the base station, of HARQ feedback for a previous transmission is incorrect.

In some aspects, the RRC signaling may indicate a number of beams to monitor for downlink transmissions, a number of new beams to use to transmit the NACK, and/or the like. In some aspects, the RRC signaling may indicate a procedure for selecting one or more new beams to use to transmit the NACK. For example, the RRC signaling may indicate that the UE is to use a number of highest ranked beams from a most recent measurement report (e.g., including the one or more current beams or excluding the one or more current beams).

As shown by reference number 510, the UE may configure the UE based at least in part on the RRC signaling In some aspects, the UE may be configured to monitor one or more beams of a set of candidate beams for one or more downlink transmissions. For example, the UE may configure one or more components of the UE to monitor a bandwidth part using one or more antennas of the UE. In some aspects, the UE may be configured to transmit a NACK, for a downlink transmission scheduled for one or more current beams, via one or more new beams of the set of candidate beams. In some aspects, the UE may be configured to receive multiple downlink transmissions during multiple downlink transmission occasions scheduled via the RRC (e.g., based at least in part on semi-persistent scheduling).

As shown by reference number 515, the UE may transmit an indication that configuration is complete. In some aspects, the UE may transmit the indication within an RRC reconfiguration complete (e.g., RRCReconfigurationComplete or RRCRC) message. Based at least in part on receiving the indication that configuration is complete, the base station may determine that the UE is configured to perform one or more processes for which the UE is configured (e.g., semi-persistent scheduling, monitoring the set of candidate beams for the one or more reference signals, transmitting a NACK via one or more new beams for a downlink transmission scheduled for one or more current beams, and/or the like).

As shown by reference number 520, the base station may transmit one or more reference signals (e.g., CSI-RSs) via a set of candidate beams. In some aspects, the base station may transmit the one or more reference signals using beam sweeping.

As shown by reference number 525, the UE may obtain a set of measurements of the one or more reference signals received over the set of candidate beams. In some aspects, the UE may identify a beam identification associated with a received reference signal based at least in part on a timing at which the UE receives the reference signal and an indication of times at which the base station is scheduled to transmit the one or more reference signals via the set of candidate beams.

As shown by reference number 530, the UE may transmit a measurement report to the base station. The measurement report may include the obtained set of measurements of the reference signals, such as RSRP, RSSI, RSRQ, and/or CQI, a ranking of the set of candidate beams (e.g., based at least in part on the obtained measurements), and/or the like.

As shown by reference number 535, the UE may determine a ranking of the set of candidate beams based at least in part on the measurements of the reference signals. In some aspects, the ranking may be based at least in part on an order of highest to lowest signal quality (e.g., as indicated using RSRP, RSSI, RSRQ, CQI, and/or the like).

As shown by reference number 540, the UE may determine the ranking of the candidate beams. In some aspects, the base station may determine the ranking of the candidate beams based at least in part on a ranking indicated within the measurement report, based at least in part on the measurements of the reference signals indicated in the measurement report, and/or the like. In some aspects, the base station and the UE may be configured to determine the ranking of the set of candidate beams based at least in part on a same procedure and/or metric so that the base station and the UE agree on the ranking.

In some aspects, the UE and the base station may be configured to automatically activate a number of the highest ranked candidate beams for communication between the UE and the base station. In some aspects, the number of highest ranked candidate beams may be based at least in part on the RRC signaling, a DCI message, and/or the like.

As shown by reference number 545, the base station may transmit a downlink transmission to the UE. In some aspects, the base station may transmit the downlink transmission using a subset of the activated highest ranked candidate beams. In some aspects, the base station may select one or more beams for transmitting the downlink transmission based at least in part on an indication provided to the UE. For example, the base station may select the one or more beams based at least in part on RRC signaling to the UE to indicate that the base station is configured to transmit downlink transmissions via one or more beams having a highest ranked CQI. In some aspects, the base station may select a number of the one or more beams based at least in part on an indication provided to the UE. For example, the base station may select two as the number of the one or more beams, based at least in part on RRC signaling indicating to the UE that the base station is configured to transmit downlink transmissions via two beams. In some aspects, the base station may transmit DCI (e.g., a transmission configuration indicator (TCI) state activating DCI) to indicate one or more beams of the activated highest ranked candidate beams through which the base station is configured to transmit the downlink transmission.

In some aspects, the base station may transmit the downlink transmission during a downlink transmission occasion that was previously scheduled (e.g., using RRC signaling). In some aspects, the UE may not receive the downlink transmission during the downlink transmission occasion.

As shown by reference number 550, the UE may transmit a NACK, via one or more new beams of the set of candidate beams, as HARQ feedback for the downlink transmission scheduled for the one or more beams of the set of candidate beams. In some aspects, the UE may transmit and the base station may receive the NACK via the one or more beams of the set of candidate beams (e.g., one or more current beams).

In some aspects, the UE may transmit the NACK via the one or more new beams of the set of candidate beams based at least in part on determining that a threshold number of downlink transmissions were not received via one or more current beams (e.g., a threshold number of consecutive downlink transmissions, a threshold portion of downlink transmission, a threshold number of downlink transmissions received over a period of time, and/or the like).

In some aspects, the UE may receive an indication of an interpretation, by the base station, of a HARQ feedback occasion associated with a previous NACK, as an ACK. The UE may transmit the NACK for the downlink transmission via the one or more new beams based at least in part on a mismatch between the interpretation by the base station and the previous NACK.

In some aspects, transmitting the NACK may include performing beam sweeping using the one or more new beams. In some aspects, the beam sweeping may include transmitting the NACK via the one or more new beams, the one or more current beams, or a combination of the one or more new beams and the one or more current beams. In some aspects, beam sweeping may be performed in an order that is based at least in part on the ranking of the set of beams, the set of measurements of the one or more reference signals received using the set of candidate beams, and/or the like.

In some aspects, the UE may select a number of the one or more new beams, to transmit the NACK, based at least in part on an indication from the base station (e.g., an indication within RRC signaling, DCI, and/or the like). In some aspects, the UE may select, for transmitting the NACK, the one or new beams based at least in part on the measurements of the set of reference signals, the measurement report, the ranking of the set of beams, and/or the like. In some aspects, the UE may transmit the NACK via the number of new beams without beam sweeping.

In some aspects, the UE may determine a timing offset between transmitting the measurement report and an occasion for the NACK feedback. In some aspects, the base station may determine to transmit the NACK via the one or more new beams based at least in part on the timing offset satisfying a threshold. In other words, the UE may transmit the NACK using an agreed beam sweeping pattern if a most recent measurement report was received at a time instant whose difference with a time instant for transmitting the NACK satisfies a threshold (e.g., is less than the threshold, is less than or equal to the threshold, and/or the like). This may avoid beam switching to the one or more new beams based at least in part on outdated, or invalid, information. This may conserve computing, communication, and/or network resources that may otherwise be consumed by beam switching to, and using for subsequent downlink transmissions, one or more new beams that are likely to fail for the subsequent downlink transmissions, but were ranked highly at the time of an outdated measurement report.

As shown by reference number 555, the base station may monitor the one or more new beams for the NACK. In some aspects the base station may be configured to monitor the one or more current beams during every HARQ feedback occasion, during every HARQ feedback occasion after a threshold number of NACKs, during periodic HARQ feedback occasions (e.g., based at least in part on time intervals, after a particular number of HARQ feedback occasions), and/or the like. In some aspects, based at least in part on receiving the NACK associated with the downlink transmission, the base station may determine that the base station is to retransmit the downlink transmission via the one or more new beams.

As shown by reference number 560, the base station may select at least one of the one or more new beams for at least one additional downlink transmission. In some aspects, the base station may select the at least one of the one or more new beams based at least in part on the measurement report, a set of measurements of the reference signals, such as RSRP, RSSI, RSRQ, and/or CQI, a ranking of the set of candidate beams (e.g., based at least in part on the obtained measurements), and/or the like.

As shown by reference number 565, the base station may transmit DCI to activate one or more new TCI states. The one or more new TCI states may be associated with the at least one of the one or more new beams. In some aspects, the base station may transmit the DCI within a DCI message to activate the at least one of one or more new beams for monitoring for a retransmission of the downlink transmission.

As shown by reference number 570, the base station may transmit an additional downlink transmission via the at least one of the one or more new beams. In some aspects, the base station may retransmit the downlink transmission via the at least one of the one or more new beams of the set of candidate beams. In some aspects, the base station may retransmit the downlink transmission via the at least one of the one or more new beams without transmitting an indication to activate the one or more new beams after the occasion for the NACK feedback. In some aspects, the base station may continue to transmit additional downlink transmissions using the at least one of the one or more new beams.

Based at least in part on beam switching to at least one new beam for communications after a failed attempt to receive a downlink transmission via one or more current beams, the UE and the base station may conserve computing, communication, and/or network resources that may otherwise have been used to attempt to transmit and receive additional downlink transmissions using the one or more current beams through which the UE has failed to receive the downlink transmission.

As indicated above, FIG. 5 is provided as an example. Other examples may differ from what is described with respect to FIG. 5.

Figure 6:
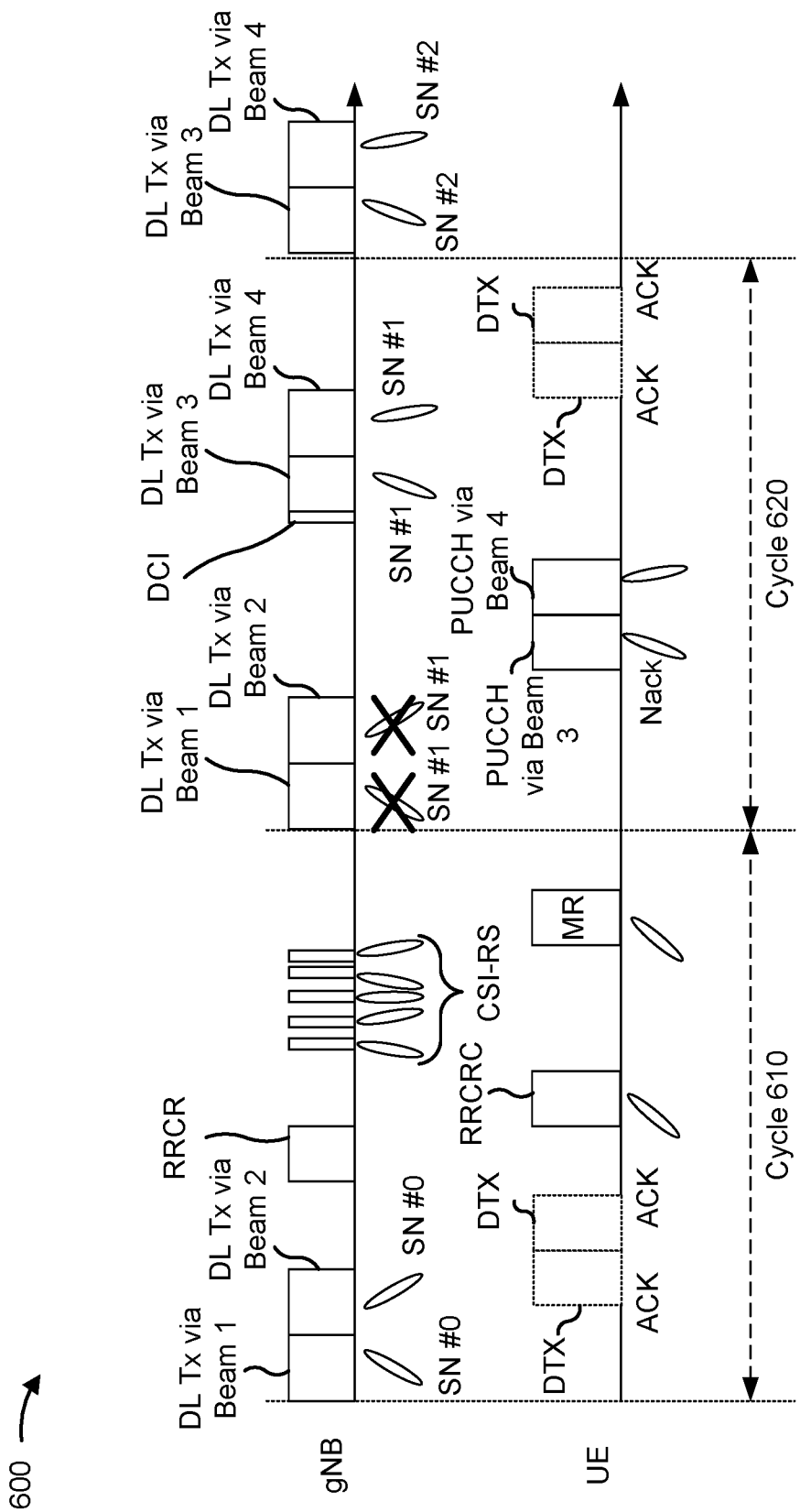
FIG. 6 is a diagram illustrating an example of beam switching based at least in part on a NACK transmission, in accordance with the present disclosure.

FIG. 6 is a diagram illustrating an example 600 of beam switching based at least in part on a NACK transmission, in accordance with the present disclosure. As shown, a UE (e.g., UE 120) and a base station (e.g., base station 110, such as a gNB) may communicate using one or more of RRC signaling, reference signals, measurement reports, downlink transmissions, HARQ feedback, DCI, and/or the like. In some aspects, the base station and the UE may be part of a wireless network (e.g., the wireless network 100).

As shown in FIG. 6, and in cycle 610, the base station may transmit a downlink transmission, having a sequence number 0, via a beam 1 and a beam 2. The base station may transmit the downlink transmission using a PDSCH. The PDSCH may be scheduled using semi-persistent scheduling. The UE may receive the downlink transmission having the sequence number 0 and may determine to transmit an ACK or to not transmit HARQ feedback (e.g., based at least in part on the UE being configured for discontinuous transmission (DTX) of HARQ feedback). The base station may interpret the ACK, or not receiving any HARQ feedback in the case of discontinuous transmission, as an indication that the UE received the downlink transmission having the sequence number 0 from at least one of the beam 1 or the beam 2, or from both of the beam 1 and the beam 2 (e.g., if the UE is configured to use a soft NACK). In some aspects, the downlink transmission having the sequence number 0 may expire at the end of cycle 610.

As also shown in cycle 610, the base station may transmit RRC signaling, such as an RRCR message, an RRC setup message, an RRC resume message, and/or the like. The RRC signaling may indicate that the UE is to be configured to monitor a set of candidate beams for one or more reference signals, to transmit a NACK via one or more new beams of the set of candidate beams, and/or the like. The UE may transmit an indication (e.g., an RRCRC message) that the UE has been configured based at least in part on the RRC signaling As further shown in cycle 610, the base station may transmit one or more reference signals (e.g., CSI-RSs) via a set of candidate beams. The UE may monitor the set of candidate beams and obtain measurements of the reference signals. In some aspects, the UE may determine a ranking of the set of candidate beams based at least in part on the measurements. In some aspects, the UE may automatically activate a number of the highest ranked candidate beams for communication with the base station.

The UE may transmit a measurement report (MR) to the base station. In some aspects, the base station may determine the ranking of the set of candidate beams based at least in part on the measurements, an indication of the ranking of the set of candidate beams within the measurement report, and/or the like. In this way, the base station and the UE may agree on a ranking of the set of candidate beams. In some aspects, the base station may automatically activate the number of highest ranked candidate beams for communication with the UE.

As shown in cycle 620, the base station may transmit a downlink transmission, having a sequence number 1, via the beam 1 and the beam 2. The downlink transmission may include DCI to indicate TCI state activation (e.g., if the UE is not configured to automatically activate the number of highest ranked candidate beams for communication with the base station). In some aspects, the downlink transmission may include an indication of an interpretation of HARQ feedback from a previous downlink transmission (e.g., the ACK of the downlink transmission having the sequence number 0 (zero)). The beam 1 and the beam 2 may be blocked and the UE may not receive the downlink transmission having the sequence number 1 during a scheduled occasion for receiving the downlink transmission.

The UE may transmit a NACK (e.g., using a PUCCH), using one or more new beams (e.g., beam 3 and/or beam 4), to indicate that the UE did not receive the downlink transmission having the sequence number 1. In some aspects, the UE does not receive the downlink transmission having the sequence number 1 based at least in part on interference (e.g., from one or more other cells), blocking, and/or the like. In some aspects, the base station may receive the NACK from the UE via the beam 3 and/or the beam 4.

As also shown in cycle 620, the base station may retransmit the downlink transmission having the sequence number 1 via at least one of the one or more new beams (e.g., the beam 3 and the beam 4) based at least in part on receiving the NACK via the at least one of the one or more new beams. In some aspects, the downlink transmission may include DCI to indicate a new TCI state activation (e.g., if the UE is not configured to automatically activate the one or more new beams through which the UE transmitted the NACK).

The UE may receive the retransmission of the downlink transmission having the sequence number 1 and may determine to transmit an ACK or to not transmit HARQ feedback. The base station may interpret the ACK, or not receiving any HARQ feedback if the UE is configured for discontinuous transmission of HARQ feedback, as an indication that the UE received the downlink transmission having the sequence number 1 from at least one of the beam 3 or the beam 4, or from both of the beam 3 and the beam 4 (e.g., if the UE is configured to use a soft NACK).

The base station and the UE may communicate at least one additional message using the one or more new beams. For example, the base station may transmit a downlink transmission, having a sequence number 2, via the beam 3 and the beam 4. The UE may monitor the beam 3 and the beam 4 for the downlink transmission having the sequence number 2 and transmit HARQ feedback for the downlink transmission having the sequence number 2.

As indicated above, FIG. 6 is provided as an example. Other examples may differ from what is described with respect to FIG. 6.

Figure 7:
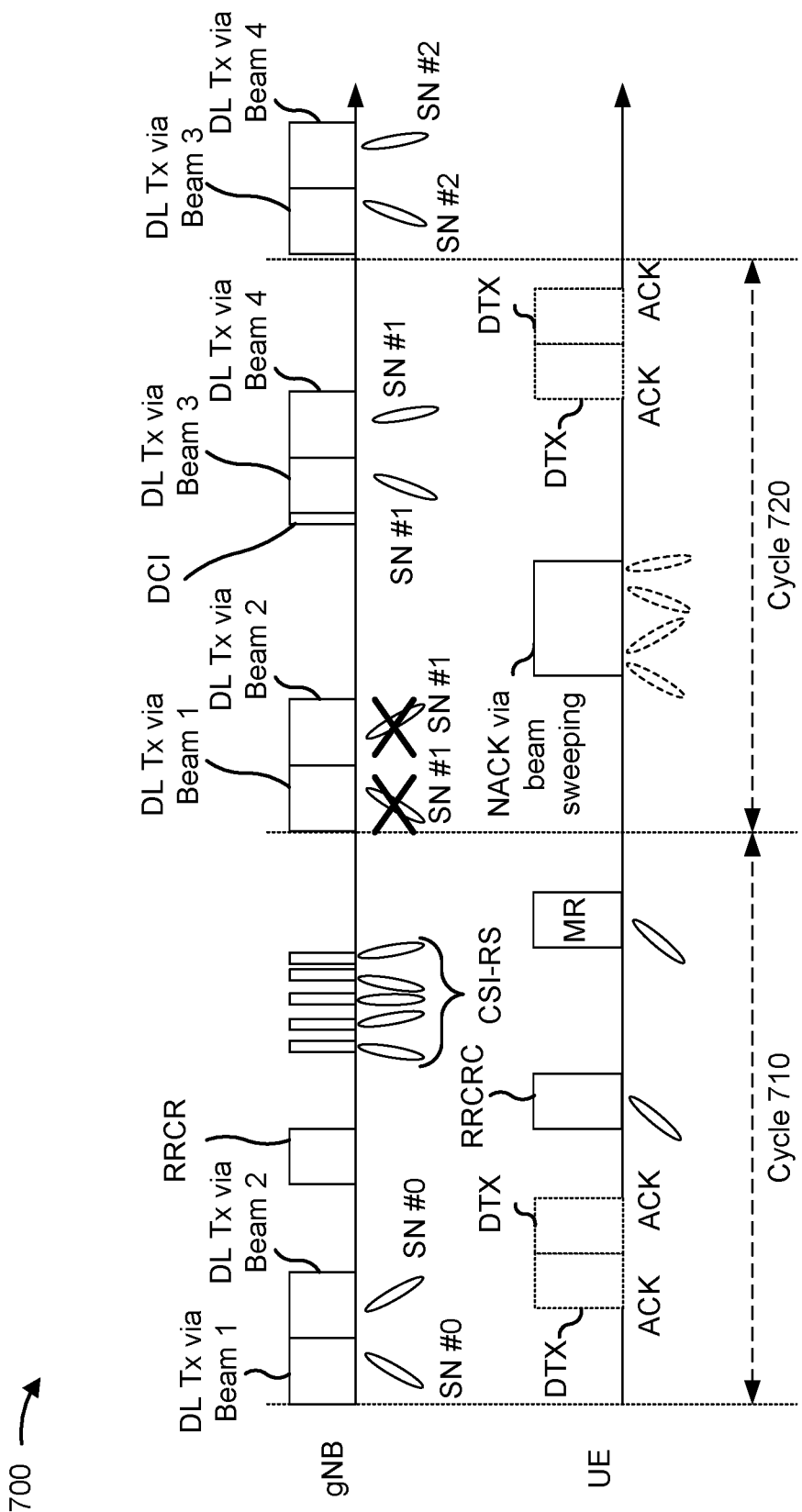
FIG. 7 is a diagram illustrating an example of beam switching based at least in part on a NACK transmission, in accordance with the present disclosure.

FIG. 7 is a diagram illustrating an example 700 of beam switching based at least in part on a NACK transmission, in accordance with the present disclosure. As shown, a UE (e.g., UE 120) and a base station (e.g., base station 110, such as a gNB) may communicate using one or more of RRC signaling, reference signals, measurement reports, downlink transmissions, HARQ feedback, DCI, and/or the like. In some aspects, the base station and the UE may be part of a wireless network (e.g., the wireless network 100).

As shown in FIG. 7, and in cycle 710, the base station may transmit a downlink transmission, having a sequence number 0, via a beam 1 and a beam 2. The base station may transmit the downlink transmission using a PDSCH. The PDSCH may be scheduled using semi-persistent scheduling. The UE may receive the downlink transmission having the sequence number 0 and may determine to transmit an ACK or to not transmit HARQ feedback. The base station may interpret the ACK, or not receiving any HARQ feedback in the case of discontinuous transmission, as an indication that the UE received the downlink transmission having the sequence number 0 from at least one of the beam 1 or the beam 2, or from both of the beam 1 and the beam 2 (e.g., if the UE is configured to use a soft NACK). In some aspects, the downlink transmission having the sequence number 0 may expire at the end of cycle 710.

As also shown in cycle 710, the base station may transmit RRC signaling, such as an RRCR message, an RRC setup message, an RRC resume message, and/or the like. The RRC signaling may indicate that the UE is to be configured to monitor a set of candidate beams for one or more reference signals, to transmit a NACK via one or more new beams of the set of candidate beams, and/or the like. The UE may transmit an indication (e.g., an RRCRC message) that the UE has been configured based at least in part on the RRC signaling As further shown in cycle 710, the base station may transmit one or more reference signals (e.g., CSI-RSs) via a set of candidate beams. The UE may monitor the set of candidate beams and obtain measurements of the reference signals. In some aspects, the UE may determine a ranking of the set of candidate beams based at least in part on the measurements. In some aspects, the UE may automatically activate a number of the highest ranked candidate beams for communication with the base station.

The UE may transmit a measurement report to the base station. In some aspects, the base station may determine the ranking of the set of candidate beams based at least in part on the measurements, an indication of the ranking of the set of candidate beams within the measurement report, and/or the like. In this way, the base station and the UE may have a synchronized ranking of the set of candidate beams. In some aspects, the base station may automatically activate the number of highest ranked candidate beams for communication with the UE.

As shown in cycle 720, the base station may transmit a downlink transmission, having a sequence number 1, via the beam 1 and the beam 2. The downlink transmission may include DCI to indicate TCI state activation (e.g., if the UE is not configured to automatically activate the number of highest ranked candidate beams for communication with the base station). In some aspects, the downlink transmission may include an indication of an interpretation of HARQ feedback from a previous downlink transmission (e.g., the ACK of the downlink transmission having the sequence number 0 (zero)). The beam 1 and the beam 2 may be blocked and the UE may not receive the downlink transmission having the sequence number 1 during a scheduled occasion for receiving the downlink transmission.

As also shown in cycle 720, the UE may perform beam sweeping using one or more new beams (e.g., a beam 3 and a beam 4) and/or the beam 1 and the beam 2. In some aspects, the UE may transmit the NACK for the downlink transmission having the sequence number 1 via the one or more new beams and/or the beam 1 and the beam 2 in an order (e.g., chronologically) based at least in part on the measurements of one or more reference signals received using the set of candidate beams, the ranking of the set of candidate beams, the measurement report, and/or the like. In some aspects, the UE may be configured to transmit the NACK via multiple beams simultaneously and the base station may simultaneously monitor multiple candidate beams for the NACK.

In some aspects, the base station may retransmit the downlink transmission having the sequence number 1 using at least one of the one or more new beams. In some aspects, the base station may transmit DCI to indicate TCI state activation (e.g., if the UE is not configured to automatically activate the number of highest ranked candidate beams for communication with the base station). In some aspects, the UE may transmit an ACK using the one or more new beams or may determine to not transmit HARQ feedback (e.g., based at least in part on the UE being configured for DTX of HARQ feedback).

The base station may interpret the ACK, or not receiving any HARQ feedback, as an indication that the UE received the downlink transmission having the sequence number 1 from at least one of the beam 3, the beam 4, or from both of the beam 3 and the beam 4 (e.g., if the UE is configured to use a soft NACK).

The base station and the UE may communicate at least one additional message using the one or more new beams. For example, the base station may transmit a downlink transmission, having a sequence number 2, via the beam 3 and the beam 4. The UE may monitor the beam 3 and the beam 4 for the downlink transmission having the sequence number 2 and transmit HARQ feedback for the downlink transmission having the sequence number 2.

As indicated above, FIG. 7 is provided as an example. Other examples may differ from what is described with respect to FIG. 7.

Figure 8:
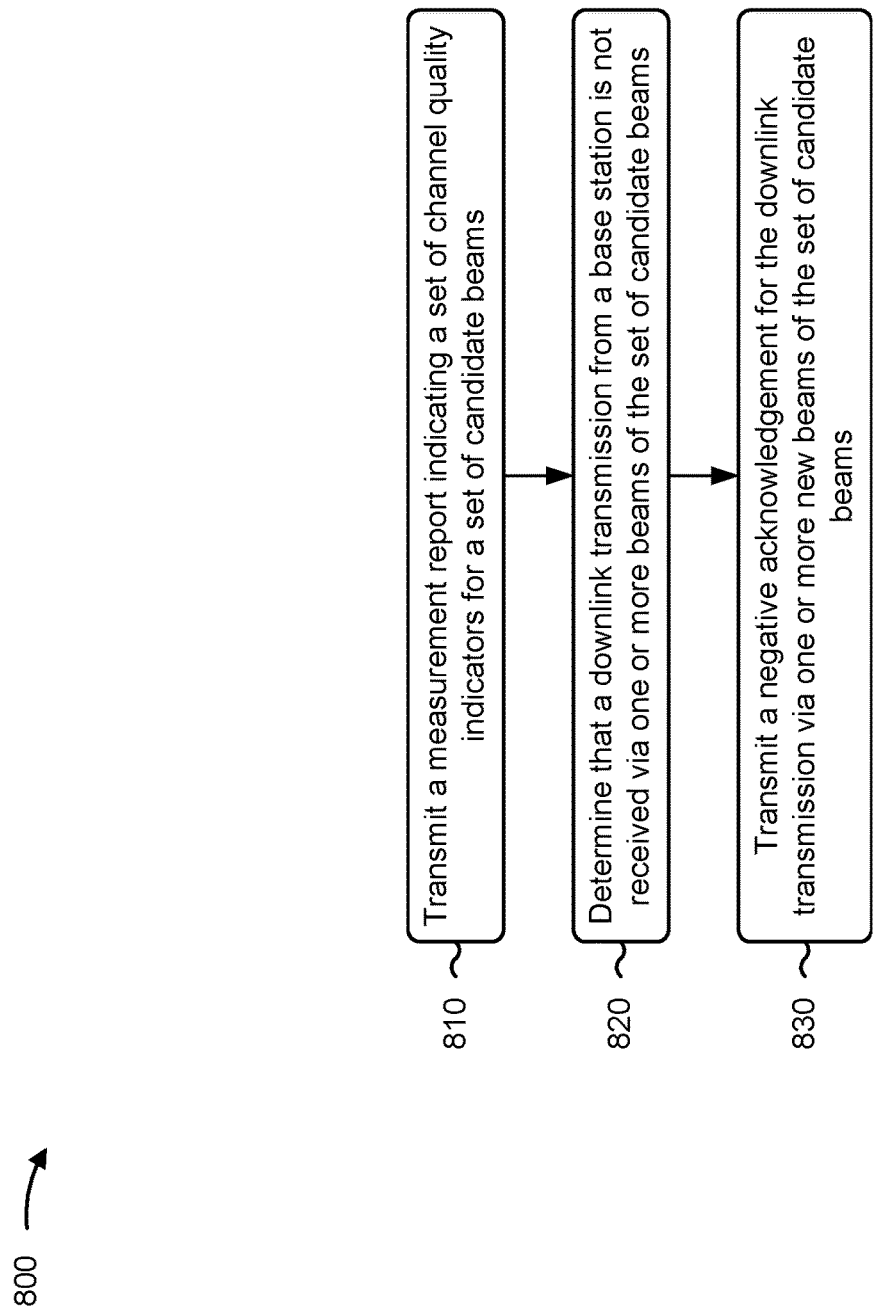
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with beam switching based at least in part on a NACK transmission.

As shown in FIG. 8, in some aspects, process 800 may include transmitting a measurement report indicating a set of CQI for a set of candidate beams (block 810). For example, the UE (e.g., using controller/processor 280, transmit processor 264, TX MIMO processor 266, MOD 254, antenna 252, and/or the like) may transmit a measurement report indicating a set of CQIs for a set of candidate beams, as described above.

As further shown in FIG. 8, in some aspects, process 800 may include determining that a downlink transmission from a base station is not received via one or more beams of the set of candidate beams (block 820). For example, the UE (e.g., using antenna 252, DEMOD 254, MIMO detector 256, receive processor 258, controller/processor 280, and/or the like) may determine that a downlink transmission from a base station is not received via one or more beams of the set of candidate beams, as described above.

As further shown in FIG. 8, in some aspects, process 800 may include transmitting a NACK for the downlink transmission via one or more new beams of the set of candidate beams (block 830). For example, the UE (e.g., using controller/processor 280, transmit processor 264, TX MIMO processor 266, MOD 254, antenna 252, and/or the like) may transmit a NACK for the downlink transmission via one or more new beams of the set of candidate beams, as described above.

Process 800 may include additional aspects, such as any single aspect or any combination of aspects described below and/or in connection with one or more other processes described elsewhere herein.

In a first aspect, transmitting the NACK for the downlink transmission via the one or more new beams of the set of candidate beams includes performing beam sweeping using the one or more new beams.

In a second aspect, alone or in combination with the first aspect, performing the beam sweeping includes performing the beam sweeping using the one or more new beams and the one or more beams.

In a third aspect, alone or in combination with one or more of the first and second aspects, performing the beam sweeping includes sequentially transmitting the NACK for the downlink transmission via the one or more new beams and the one or more beams in an order that is based at least in part on the set of CQIs.

In a fourth aspect, alone or in combination with one or more of the first through third aspects, process 800 includes transmitting the NACK for the downlink transmission via the one or more beams of the set of candidate beams, and receiving an indication of an interpretation, by the base station, of a HARQ feedback occasion associated with the NACK as an acknowledgement, and transmitting the NACK for the downlink transmission via the one or more new beams is based at least in part on a mismatch between the interpretation by the base station and the NACK.

In a fifth aspect, alone or in combination with one or more of the first through fourth aspects, process 800 includes receiving RRC reconfiguration, RRC connection setup, RRC reestablishment, RRC setup, or RRC resume signaling including an indication to monitor the set of candidate beams for one or more reference signals, configuring the UE to monitor the set of candidate beams for the one or more reference signals, and transmitting an indication that the UE is configured to monitor the set of candidate beams for the one or more reference signals.

In a sixth aspect, alone or in combination with one or more of the first through fifth aspects, process 800 includes obtaining measurements of the one or more reference signals received over the set of candidate beams, and determining a ranking, based at least in part on the measurements of the one or more reference signals, of candidate beams of the set of candidate beams.

In a seventh aspect, alone or in combination with one or more of the first through sixth aspects, process 800 includes selecting, for receiving the downlink transmission, the one or more beams based at least in part on the set of CQIs.

In an eighth aspect, alone or in combination with one or more of the first through seventh aspects, process 800 includes selecting a number of the one or more beams based at least in part on a configuration of the UE.

In a ninth aspect, alone or in combination with one or more of the first through eighth aspects, process 800 includes selecting, for transmitting the NACK for the downlink transmission, the one or more new beams based at least in part on the set of CQIs.

In a tenth aspect, alone or in combination with one or more of the first through ninth aspects, process 800 includes selecting a number of the one or more new beams based at least in part on a configuration of the UE.

In an eleventh aspect, alone or in combination with one or more of the first through tenth aspects, process 800 includes determining that a timing offset, between transmitting the measurement report and an occasion for transmitting the NACK via the one or more new beams of the set of candidate beams, satisfies a timing threshold, and transmitting the NACK via the one or more new beams of the set of candidate beams is based at least in part on determining that the timing offset satisfies the timing threshold.

In a twelfth aspect, alone or in combination with one or more of the first through eleventh aspects, process 800 includes receiving a DCI message indicating that at least one of the one or more new beams is to be used for at least one additional downlink transmission.

In a thirteenth aspect, alone or in combination with one or more of the first through twelfth aspects, the at least one additional downlink transmission includes a retransmission of the downlink transmission.

In a fourteenth aspect, alone or in combination with one or more of the first through thirteenth aspects, transmitting the NACK for the downlink transmission via the one or more new beams of the set of candidate beams includes transmitting the NACK for the downlink transmission via the one or more new beams without receiving, from a base station, an indication to transmit the NACK for the downlink transmission via the one or more new beams after determining that the downlink transmission from the base station is not received via the one or more beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
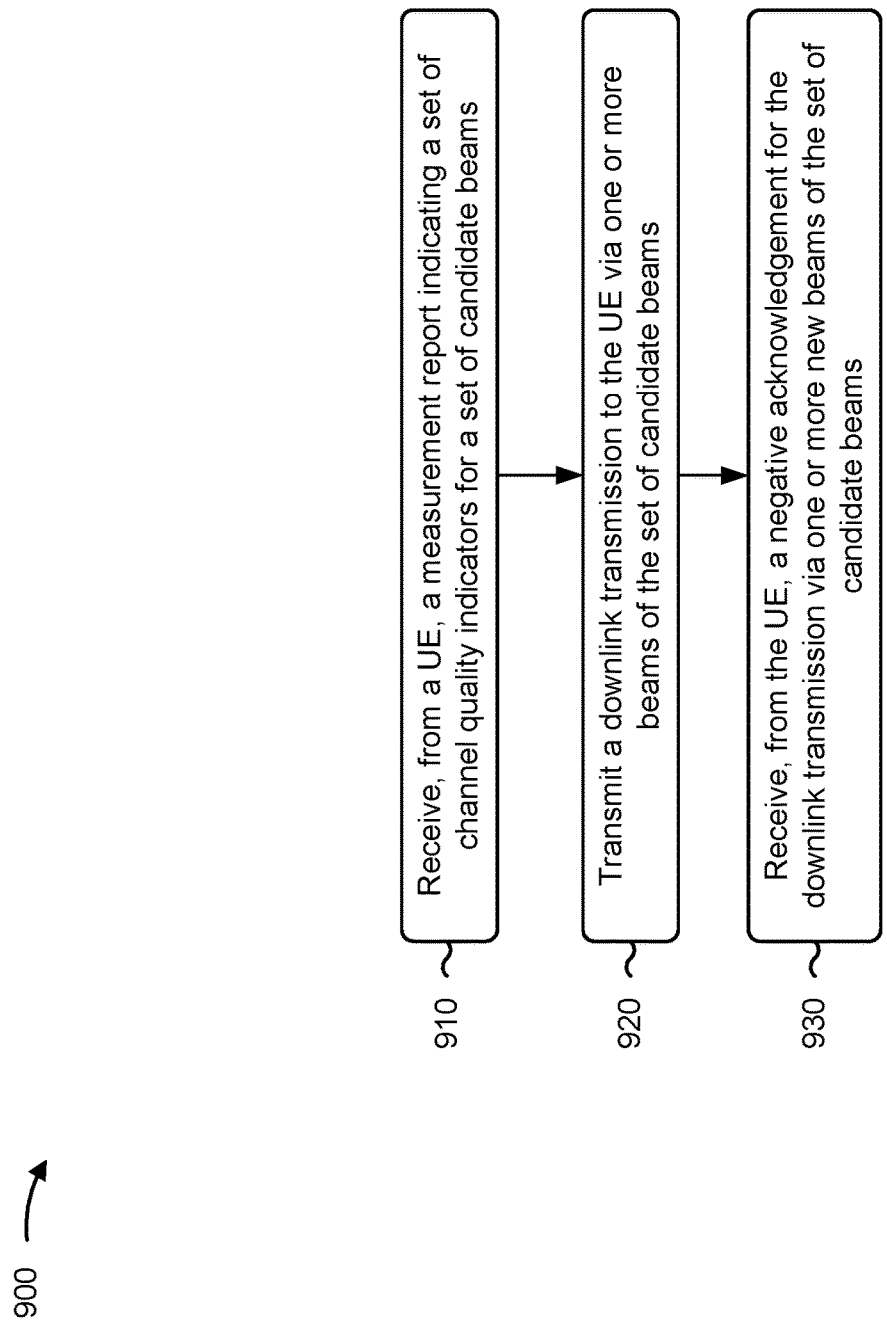
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110 and/or the like) performs operations associated with beam switching based at least in part on a NACK transmission.

As shown in FIG. 9, in some aspects, process 900 may include receiving, from a UE, a measurement report indicating a set of CQIs for a set of candidate beams (block 910). For example, the base station (e.g., using antenna 234, DEMOD 232, MIMO detector 236, receive processor 238, controller/processor 240, and/or the like) may receive, from a UE, a measurement report indicating a set of CQIs for a set of candidate beams, as described above.

As further shown in FIG. 9, in some aspects, process 900 may include transmitting a downlink transmission to the UE via one or more beams of the set of candidate beams (block 920). For example, the base station (e.g., using controller/processor 240, transmit processor 220, TX MIMO processor 230, MOD 232, antenna 234, and/or the like) may transmit a downlink transmission to the UE via one or more beams of the set of candidate beams, as described above.

As further shown in FIG. 9, in some aspects, process 900 may include receiving, from the UE, a NACK for the downlink transmission via one or more new beams of the set of candidate beams (block 930). For example, the base station (e.g., using antenna 234, DEMOD 232, MIMO detector 236, receive processor 238, controller/processor 240, and/or the like) may receive, from the UE, a NACK for the downlink transmission via one or more new beams of the set of candidate beams, as described above.

Process 900 may include additional aspects, such as any single aspect or any combination of aspects described below and/or in connection with one or more other processes described elsewhere herein.

In a first aspect, receiving the NACK for the downlink transmission via the one or more new beams of the set of candidate beams includes monitoring the one or more new beams of the set of candidate beams for the NACK for the downlink transmission.

In a second aspect, alone or in combination with the first aspect, receiving the NACK for the downlink transmission via the one or more new beams of the set of candidate beams includes monitoring the one or more new beams of the set of candidate beams and the one or more beams for the NACK for the downlink transmission.

In a third aspect, alone or in combination with one or more of the first and second aspects, monitoring the one or more new beams and the one or more beams includes sequentially monitoring for the NACK for the downlink transmission via the one or more new beams and the one or more beams in an order that is based at least in part on the set of CQIs.

In a fourth aspect, alone or in combination with one or more of the first through third aspects, process 900 includes selecting at least one of the one or more new beams of the set of candidate beams for at least one additional downlink transmission.

In a fifth aspect, alone or in combination with one or more of the first through fourth aspects, selecting the at least one of the one or more new beams of the set of candidate beams for the at least one additional downlink transmission includes selecting the at least one of the one or more new beams of the set of candidate beams for the at least one additional downlink transmission based at least in part on the set of CQIs.

In a sixth aspect, alone or in combination with one or more of the first through fifth aspects, process 900 includes transmitting a DCI message indicating that at least one of the one or more new beams is to be used for the at least one additional downlink transmission.

In a seventh aspect, alone or in combination with one or more of the first through sixth aspects, process 900 includes determining that a timing offset, between receiving the measurement report and an occasion for receiving the NACK via the one or more new beams of the set of candidate beams, satisfies a timing threshold, and transmitting the DCI message indicating that the at least one of the one or more new beams is to be used for the at least one additional downlink transmission is based at least in part on determining that the timing offset satisfies the timing threshold.

In an eighth aspect, alone or in combination with one or more of the first through seventh aspects, the at least one additional downlink transmission includes a retransmission of the downlink transmission.

In a ninth aspect, alone or in combination with one or more of the first through eighth aspects, process 900 includes selecting a number of the one or more new beams based at least in part on an indication provided to the UE.

In a tenth aspect, alone or in combination with one or more of the first through ninth aspects, process 900 includes transmitting RRC reconfiguration signaling including an indication to monitor the set of candidate beams for one or more reference signals, and receiving an indication that the UE is configured to monitor the set of candidate beams for the one or more reference signals In an eleventh aspect, alone or in combination with one or more of the first through tenth aspects, process 900 includes selecting, for transmitting the downlink transmission, the one or more beams based at least in part on the set of CQIs.

In a twelfth aspect, alone or in combination with one or more of the first through eleventh aspects, process 900 includes selecting a number of the one or more beams based at least in part on an indication provided to the UE.

In a thirteenth aspect, alone or in combination with one or more of the first through twelfth aspects, receiving the NACK for the downlink transmission via the one or more new beams of the set of candidate beams includes receiving the NACK for the downlink transmission via the one or more new beams without transmitting an indication to transmit the NACK for the downlink transmission via the one or more new beams after transmitting the downlink transmission to the UE via the one or more beams of the set of candidate beams.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: transmitting a measurement report indicating a set of channel quality indicators for a set of candidate beams; determining that a downlink transmission from a base station is not received via one or more beams of the set of candidate beams; and transmitting a negative acknowledgement for the downlink transmission via one or more new beams of the set of candidate beams.

Aspect 2: The method of Aspect 1, wherein transmitting the negative acknowledgement for the downlink transmission via the one or more new beams of the set of candidate beams comprises: performing beam sweeping using the one or more new beams.

Aspect 3: The method of Aspect 2, wherein performing the beam sweeping comprises: performing the beam sweeping using the one or more new beams and the one or more beams.

Aspect 4: The method of Aspect 3, wherein performing the beam sweeping comprises: sequentially transmitting the negative acknowledgement for the downlink transmission via the one or more new beams and the one or more beams in an order that is based at least in part on the set of channel quality indicators.

Aspect 5: The method of any of Aspects 1-4, further comprising: transmitting the negative acknowledgement for the downlink transmission via the one or more beams of the set of candidate beams; and receiving an indication of an interpretation, by the base station, of a hybrid automatic repeat request (HARQ) feedback occasion associated with the negative acknowledgement as an acknowledgement, wherein transmitting the negative acknowledgement for the downlink transmission via the one or more new beams is based at least in part on a mismatch between the interpretation by the base station and the negative acknowledgement.

Aspect 6: The method of any of Aspects 1-5, further comprising: receiving radio resource control (RRC) reconfiguration, RRC connection setup, RRC reestablishment, RRC setup, or RRC resume signaling including an indication to monitor the set of candidate beams for one or more reference signals; configuring the UE to monitor the set of candidate beams for the one or more reference signals; and transmitting an indication that the UE is configured to monitor the set of candidate beams for the one or more reference signals.

Aspect 7: The method of Aspect 6, further comprising: obtaining measurements of the one or more reference signals received over the set of candidate beams; and determining a ranking, based at least in part on the measurements of the one or more reference signals, of candidate beams of the set of candidate beams.

Aspect 8: The method of any of Aspects 1-7, further comprising: selecting, for receiving the downlink transmission, the one or more beams based at least in part on the set of channel quality indicators.

Aspect 9: The method of any of Aspects 1-8, further comprising: selecting a number of the one or more beams based at least in part on a configuration of the UE.

Aspect 10: The method of any of Aspects 1-9, further comprising: selecting, for transmitting the negative acknowledgement for the downlink transmission, the one or more new beams based at least in part on the set of channel quality indicators.

Aspect 11: The method of any of Aspects 1-10, further comprising: selecting a number of the one or more new beams based at least in part on a configuration of the UE.

Aspect 12: The method of any of Aspects 1-11, further comprising: determining that a timing offset, between transmitting the measurement report and an occasion for transmitting the negative acknowledgement via the one or more new beams of the set of candidate beams, satisfies a timing threshold, wherein transmitting the negative acknowledgement via the one or more new beams of the set of candidate beams is based at least in part on determining that the timing offset satisfies the timing threshold.

Aspect 13: The method of any of Aspects 1-12, further comprising: receiving a downlink control information message indicating that at least one of the one or more new beams is to be used for at least one additional downlink transmission.

Aspect 14: The method of Aspect 13, wherein the at least one additional downlink transmission includes a retransmission of the downlink transmission.

Aspect 15: The method of any of Aspects 1-14, wherein transmitting the negative acknowledgement for the downlink transmission via the one or more new beams of the set of candidate beams comprises: transmitting the negative acknowledgement for the downlink transmission via the one or more new beams without receiving, from a base station, an indication to transmit the negative acknowledgement for the downlink transmission via the one or more new beams after determining that the downlink transmission from the base station is not received via the one or more beams.

Aspect 16: A method of wireless communication performed by a base station, comprising: receiving, from a user equipment (UE), a measurement report indicating a set of channel quality indicators for a set of candidate beams; transmitting a downlink transmission to the UE via one or more beams of the set of candidate beams; and receiving, from the UE, a negative acknowledgement for the downlink transmission via one or more new beams of the set of candidate beams.

Aspect 17: The method of Aspect 16, wherein receiving the negative acknowledgement for the downlink transmission via the one or more new beams of the set of candidate beams comprises: monitoring the one or more new beams of the set of candidate beams for the negative acknowledgement for the downlink transmission.

Aspect 18: The method of any of Aspects 16-17, wherein receiving the negative acknowledgement for the downlink transmission via the one or more new beams of the set of candidate beams comprises: monitoring the one or more new beams of the set of candidate beams and the one or more beams for the negative acknowledgement for the downlink transmission.

Aspect 19: The method of Aspect 18, wherein monitoring the one or more new beams and the one or more beams comprises: sequentially monitoring for the negative acknowledgement for the downlink transmission via the one or more new beams and the one or more beams in an order that is based at least in part on the set of channel quality indicators.

Aspect 20: The method of any of Aspects 16-19, further comprising: selecting at least one of the one or more new beams of the set of candidate beams for at least one additional downlink transmission.

Aspect 21: The method of Aspect 20, wherein selecting the at least one of the one or more new beams of the set of candidate beams for the at least one additional downlink transmission comprises: selecting the at least one of the one or more new beams of the set of candidate beams for the at least one additional downlink transmission based at least in part on the set of channel quality indicators.

Aspect 22: The method of Aspect 20, further comprising: transmitting a downlink control information message indicating that at least one of the one or more new beams is to be used for the at least one additional downlink transmission.

Aspect 23: The method of Aspect 22, further comprising: determining that a timing offset, between receiving the measurement report and an occasion for receiving the negative acknowledgement via the one or more new beams of the set of candidate beams, satisfies a timing threshold, wherein transmitting the downlink control information message indicating that the at least one of the one or more new beams is to be used for the at least one additional downlink transmission is based at least in part on determining that the timing offset satisfies the timing threshold.

Aspect 24: The method of Aspect 22, wherein the at least one additional downlink transmission includes a retransmission of the downlink transmission.

Aspect 25: The method of any of Aspects 16-24, further comprising: selecting a number of the one or more new beams based at least in part on an indication provided to the UE.

Aspect 26: The method of any of Aspects 16-25, further comprising: transmitting radio resource control (RRC) reconfiguration signaling including an indication to monitor the set of candidate beams for one or more reference signals; and receiving an indication that the UE is configured to monitor the set of candidate beams for the one or more reference signals.

Aspect 27: The method of any of Aspects 16-26, further comprising: selecting, for transmitting the downlink transmission, the one or more beams based at least in part on the set of channel quality indicators.

Aspect 28: The method of any of Aspects 16-27, further comprising: selecting a number of the one or more beams based at least in part on an indication provided to the UE.

Aspect 29: The method of any of Aspects 16-28, wherein receiving the negative acknowledgement for the downlink transmission via the one or more new beams of the set of candidate beams comprises: receiving the negative acknowledgement for the downlink transmission via the one or more new beams without transmitting an indication to transmit the negative acknowledgement for the downlink transmission via the one or more new beams after transmitting the downlink transmission to the UE via the one or more beams of the set of candidate beams.

Aspect 30: An apparatus for wireless communication at a device, comprising a processor; memory coupled with the processor; and instructions stored in the memory and executable by the processor to cause the apparatus to perform the method of one or more Aspects of Aspects 1-29.

Aspect 31: A device for wireless communication, comprising a memory and one or more processors coupled to the memory, the memory and the one or more processors configured to perform the method of one or more Aspects of Aspects 1-29.

Aspect 32: An apparatus for wireless communication, comprising at least one means for performing the method of one or more Aspects of Aspects 1-29.

Aspect 33: A non-transitory computer-readable medium storing code for wireless communication, the code comprising instructions executable by a processor to perform the method of one or more Aspects of Aspects 1-29.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 1-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:

transmit a measurement report indicating a set of channel quality indicators for a set of candidate beams;

determine that a downlink transmission, transmitted from a base station via one or more beams of the set of candidate beams, is not received; and transmit a negative acknowledgement for the downlink transmission, via one or more new beams of the set of candidate beams, without receiving an indication to transmit the negative acknowledgement for the downlink transmission via the one or more new beams after determining that the downlink transmission via the one or more beams is not received.

2. The UE of claim 1, wherein the one or more processors, when transmitting the negative acknowledgement for the downlink transmission via the one or more new beams of the set of candidate beams, are configured to:

perform beam sweeping using the one or more new beams.

3. The UE of claim 2, wherein the one or more processors, when performing the beam sweeping, are configured to:

perform the beam sweeping using the one or more new beams and the one or more beams.

4. The UE of claim 3, wherein the one or more processors, when performing the beam sweeping, are configured to:

sequentially transmit the negative acknowledgement for the downlink transmission via the one or more new beams and the one or more beams in an order that is based at least in part on the set of channel quality indicators.

5. The base station of claim 1, wherein the one or more processors are further configured to:

transmit the negative acknowledgement for the downlink transmission via the one or more beams of the set of candidate beams; and receive an indication of an interpretation of a hybrid automatic repeat request (HARQ) feedback occasion associated with the negative acknowledgement as an acknowledgement, wherein transmission of the negative acknowledgement for the downlink transmission via the one or more new beams is based at least in part on a mismatch between the interpretation by the base station and the negative acknowledgement.

6. The UE of claim 1, wherein the one or more processors are further configured to:

receive radio resource control (RRC) reconfiguration, RRC connection setup, RRC reestablishment, RRC setup, or RRC resume signaling including an indication to monitor the set of candidate beams for one or more reference signals;

configure the UE to monitor the set of candidate beams for the one or more reference signals; and transmit an indication that the UE is configured to monitor the set of candidate beams for the one or more reference signals.

7. The UE of claim 6, wherein the one or more processors are further configured to:

obtain measurements of the one or more reference signals received over the set of candidate beams; and determine a ranking, based at least in part on the measurements of the one or more reference signals, of candidate beams of the set of candidate beams.

8. The UE of claim 1, wherein the one or more processors are further configured to:

select, for receiving the downlink transmission, the one or more beams based at least in part on the set of channel quality indicators.

9. The UE of claim 1, wherein the one or more processors are further configured to:

select, for transmitting the negative acknowledgement for the downlink transmission, the one or more new beams based at least in part on the set of channel quality indicators.

10. The UE of claim 1, wherein the one or more processors are further configured to:

determine that a timing offset, between transmitting the measurement report and an occasion for transmitting the negative acknowledgement via the one or more new beams of the set of candidate beams, satisfies a timing threshold, wherein transmission of the negative acknowledgement via the one or more new beams of the set of candidate beams is based at least in part on determining that the timing offset satisfies the timing threshold.

11. The UE of claim 1, wherein the one or more processors are further configured to:

receive a downlink control information message indicating that at least one of the one or more new beams is to be used for at least one additional downlink transmission.

12. The UE of claim 1, wherein the negative acknowledgement is transmitted via the one or more new beams before receiving a retransmission of the downlink transmission via the one or more new beams.

13. A method of wireless communication performed by a user equipment (UE), comprising:

transmitting a measurement report indicating a set of channel quality indicators for a set of candidate beams;

determining that a downlink transmission, transmitted from a base station via one or more beams of the set of candidate beams, is not received; and transmitting a negative acknowledgement for the downlink transmission, via one or more new beams of the set of candidate beams, without receiving an indication to transmit the negative acknowledgement for the downlink transmission via the one or more new beams after determining that the downlink transmission via the one or more beams is not received.

14. The method of claim 13, wherein transmitting the negative acknowledgement for the downlink transmission via the one or more new beams of the set of candidate beams comprises:

performing beam sweeping using the one or more new beams.

15. The method of claim 14, wherein performing the beam sweeping comprises:

performing the beam sweeping using the one or more new beams and the one or more beams.

16. The method of claim 15, wherein performing the beam sweeping comprises:

sequentially transmitting the negative acknowledgement for the downlink transmission via the one or more new beams and the one or more beams in an order that is based at least in part on the set of channel quality indicators.

17. The method of claim 13, further comprising:

transmitting the negative acknowledgement for the downlink transmission via the one or more beams of the set of candidate beams; and receiving an indication, by the base station, of a hybrid automatic repeat request (HARQ) feedback occasion associated with the negative acknowledgement as an acknowledgement, wherein transmitting the negative acknowledgement for the downlink transmission via the one or more new beams is based at least in part on a mismatch between the interpretation by the base station and the negative acknowledgement.

18. The method of claim 13, further comprising:
receiving radio resource control (RRC) reconfiguration, RRC connection setup, RRC reestablishment, RRC setup, or RRC resume signaling including an indication to monitor the set of candidate beams for one or more reference signals;
configuring the UE to monitor the set of candidate beams for the one or more reference signals; and
transmitting an indication that the UE is configured to monitor the set of candidate beams for the one or more reference signals.

19. The method of claim 18, further comprising:
obtaining measurements of the one or more reference signals received over the set of candidate beams; and
determining a ranking, based at least in part on the measurements of the one or more reference signals, of candidate beams of the set of candidate beams.

20. The method of claim 13, further comprising:
selecting, for receiving the downlink transmission, the one or more beams based at least in part on the set of channel quality indicators.

21. The method of claim 13, further comprising:
selecting, for transmitting the negative acknowledgement for the downlink transmission, the one or more new beams based at least in part on the set of channel quality indicators.

22. The method of claim 13, further comprising:
determining that a timing offset, between transmitting the measurement report and an occasion for transmitting the negative acknowledgement via the one or more new beams of the set of candidate beams, satisfies a timing threshold,
wherein transmitting the negative acknowledgement via the one or more new beams of the set of candidate beams is based at least in part on determining that the timing offset satisfies the timing threshold.

23. The method of claim 13, further comprising:
receiving a downlink control information message indicating that at least one of the one or more new beams is to be used for at least one additional downlink transmission.

24. The method of claim 23, wherein the at least one additional downlink transmission includes a retransmission of the downlink transmission.

25. The method of claim 13, wherein the negative acknowledgement is transmitted via the one or more new beams before receiving a retransmission of the downlink transmission via the one or more new beams.

26. A non-transitory computer-readable medium storing a set of instructions for wireless communication, the set of instructions comprising:
one or more instructions that, when executed by one or more processors of a user equipment (UE), cause the UE to:
transmit a measurement report indicating a set of channel quality indicators for a set of candidate beams;
determine that a downlink transmission, transmitted from a base station via one or more beams of the set of candidate beams, is not received; and
transmit a negative acknowledgement for the downlink transmission, via one or more new beams of the set of candidate beams, without receiving an indication to transmit the negative acknowledgement for the downlink transmission via the one or more new beams after determining that the downlink transmission via the one or more beams is not received.

27. The non-transitory computer-readable medium of claim 26, wherein the one or more instructions, that cause the UE to transmit the negative acknowledgement for the downlink transmission via the one or more new beams of the set of candidate beams, cause the UE to:
perform beam sweeping using the one or more new beams.

28. The non-transitory computer-readable medium of claim 26, wherein the one or more instructions further cause the UE to:
receive radio resource control (RRC) reconfiguration, RRC connection setup, RRC reestablishment, RRC setup, or RRC resume signaling including an indication to monitor the set of candidate beams for one or more reference signals;
configure the UE to monitor the set of candidate beams for the one or more reference signals; and
transmit an indication that the UE is configured to monitor the set of candidate beams for the one or more reference signals.

29. An apparatus for wireless communication, comprising:
means for transmitting a measurement report indicating a set of channel quality indicators for a set of candidate beams;
means for determining that a downlink transmission, transmitted from a base station via one or more beams of the set of candidate beams, is not received; and
means for transmitting a negative acknowledgement for the downlink transmission, via one or more new beams of the set of candidate beams, without receiving an indication to transmit the negative acknowledgement for the downlink transmission via the one or more new beams after determining that the downlink transmission via the one or more beams is not received.

30. The apparatus of claim 29, wherein the means for transmitting the negative acknowledgement for the downlink transmission via the one or more new beams of the set of candidate beams comprises:
means for performing beam sweeping using the one or more new beams.

* * * * *